UNITED STATES PATENT OFFICE 2,658,929

1,1,6,6-TETRACHLORO-1,5-HEXADIENE

Elbert C. Ladd, Passaic, and Herbert Sargent, Glen Rock, N. J., assignors to United States Rubber Company, New York, N. Y., a corporation of New Jersey No Drawing. Application August 27, 1949,
Serial No. 112,832

1 Claim. (Cl. 260—654)

The invention relates to the preparation of a novel class of compounds, 1,1,6,6-tetrahalogeno-1,5-hexadienes, by the catalytic hydrogenative coupling of 3,3,3-trihalogeno-1-alkenes.

In copending application Serial No. 752,820 we have disclosed a process for the catalytic hydrogenation of aliphatic compounds containing a trihalogenomethyl group whereby halogen is removed with concurrent coupling of the residual radicals to form new compounds containing adjacent dihalogenomethylene groups. This is illustrated below for 1,1,1-trichloropropane:

(1) $2Cl_3C$—$CH_2$—$CH_3 + H_2 \rightarrow$
$CH_3$—$CH_2$—$CCl_2$—$CCl_2$—$CH_2$—$CH_3$ We have now unexpectedly discovered that trihalogenomethyl alkenes in which the olefinic linkage is in the alpha,beta position with respect to the trihalogenomethyl group e. g., 3,3,3-trichloro-1-propene, undergo a unique type of hydrogenative coupling reaction in which the resulting coupled product bears the dihalogenomethylene groups at the terminal positions of the molecule. For example:

(2) $2CH_2$=$CH$—$CCl_3 + H_2 \rightarrow$
$Cl_2C$=$CH$—$CH_2$—$CH_2$—$CH$=$CCl_2$ We have further discovered that the identical compound can also be obtained by the hydrogenative coupling of 1,1,3-trichloro-1-propene, thus:

(3) $2Cl_2C$=$CH$—$CH_2$—$Cl + H_2 \rightarrow$
$Cl_2C$=$CH$—$CH_2$—$CH_2$—$CH$=$CCl_2$ These new halogenated 1,5-hexadienes are useful in a variety of applications including solvents, lube-oil additives and textile assistants and are likewise of interest as synthetic intermediates. For example, they undergo acidic hydrolysis to form dibasic acids, thus:

(4)

$Cl_2C$=$CH$—$CH_2$—$CH_2$—$CH$=$CCl_2$ + $H_2O$ $\xrightarrow{acid}$
$HOOC$—$(CH_2)_4$—$COOH$ Although the foregoing description of our invention has been illustrated by the coupling of 3,3,3-trichloro-1-propene, our process is likewise applicable to other alpha,alpha,alpha-trihalogeno-beta-alkenes. These may be represented by the general formula $X_3C$—$C(R)$=$CR'R''$ wherein each X is chlorine or bromine, and R, R' and R'' are each radicals selected from the class of hydrogen, alkyl or substituted alkyl groups (e. g., methyl, chloromethyl, carboxymethyl, cyanomethyl, ethyl, ethoxyethyl, phenoxyethyl, propyl, butyl, isobutyl, amyl, hexyl, cyclohexyl, heptyl, octyl, nonyl, decyl) and aryl and substituted aryl groups (e. g., phenyl, naphthyl, tolyl, xylyl, p-chlorophenyl, 2,5-dichlorophenyl). The hydrogenative coupling of such compounds yields products of the type $[X_2C$=$C(R)$—$C(R')(R'')]_2$ wherein X, R, R' and R'' have the same significance as above. Illustrative of such products are:

$[Br_2C$=$CH$—$CH_2]_2$
$[Cl_2C$=$CH$—$CH(CH_3)]_2$
$[Cl_2C$=$CH$—$CH(C_6H_{13})]_2$ and $[Cl_2C$=$CH$—$CH((CH_2)_8$—$CO$—$OCH_3)]_2$
$[Cl_2C$=$C(CH_3)$—$CH(CH_3)]_2$ and $[Cl_2C$=$CH$—$CH(C_6H_5)]_2$ In the practice of our invention the trihalogenomethylalkene is shaken with one or more, e. g., 1–3, molar equivalents of hydrogen in the presence of a hydrogenation catalyst such as Raney nickel, platinum, palladium, or salts or oxides of said metals, e. g., platinum oxide, and a hydrogen halide acceptor, e. g., an alkali such as ammonia, sodium acetate, sodium hydroxide, or other compounds which will react with the hydrogen halide evolved in the reaction and neutralize it. The amount of the hydrogenation catalyst employed is not critical, and from 0.3–7.0 g. per mole of the trihalogenomethylalkene have generally proven adequate. The amount of alkali should be at least equivalent to the theoretical quantity of acid to be evolved by the reaction. Inert diluents, particularly lower alkanols such as ethanol, can also be employed.

In our reaction the absorption of the theoretical quantity of hydrogen proceeds smoothly and rapidly at room temperature, i. e., at ca. 25° C., and atmospheric pressure; hence, the use of elevated temperatures and superatmospheric pressures is usually unnecessary.

At the end of the reaction, i. e., when approximately the theoretical quantity of hydrogen has been absorbed, the organic components of the reaction mixture are extracted with an appropriate solvent and the product is isolated from the extract by fractional distillation or crystallization.

The following example discloses our invention in more detail.

*Example*

One hundred and forty-five (145) grams of freshly distilled 3,3,3-trichloro-1-propene are mixed with 90 ml. of 13 N aqueous ammonia, 50 ml. of water containing 0.5 g. of platinum which has been previously prepared by reduction of platinum oxide in the manner of Adkins (cf. "Organic Syntheses" Coll. vol. I by Gilman and Blatt).

The mixture is enclosed in a glass vessel whose sole outlet is attached to a reservoir of hydrogen at 25° C. and atmospheric pressure. The vessel and contents are agitated for 4 hours during which time ca. 13,000 ml. of hydrogen are absorbed. The reaction mixture is then diluted with several volumes of water and extracted with n-hexane. After drying, the extract is fractionally distilled to yield 57 g. of the new compound, 1,1,6,6 - tetrachloro - 1,5 - hexadiene, B. 69–70° C./2mm.; $n_D^{20}$ 1.5157; carbon=32.5% (theory = 32.7%; hydrogen = 2.56% (theory =2.73%); chlorine=65.03% (theory=64.5%).

The above hexadiene can likewise be obtained by catalytically hydrogenating 1,1,3 - trichloropropene in the same manner.

Having thus described our invention, what we claim and desire to protect by Letters Patent is:

A compound of the formula $$Cl_2C=CH-CH_2-CH_2-CH=CCl_2$$

ELBERT C. LADD.
HERBERT SARGENT.

References Cited in the file of this patent

Borsche et al., "Ber. der duet. chem. Gesell.," vol. 48, pages 452–7 (1915).

Busch et al., Ibid, vol. 49, pages 1063–71 (1916).

Kelber et al., Ibid, vol. 50, pages 305–10 (1917).

Prins, "Rec. des Trav. Chim. des Pays Bas," vol. 51, pages 1069–71, 1080 (1932).

Coffman et al. "Jour. Amer. Chem, Soc.," vol 55, page 2046 (1933).